US012441266B2

(12) United States Patent
Faruque et al.

(10) Patent No.: US 12,441,266 B2
(45) Date of Patent: Oct. 14, 2025

(54) AIRBAG ASSEMBLY FOR CHILD-RESTRAINT SYSTEM

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 18/307,310

(22) Filed: Apr. 26, 2023

(65) Prior Publication Data

US 2024/0359652 A1   Oct. 31, 2024

(51) Int. Cl.
*B60R 21/015* (2006.01)
*B60R 21/00* (2006.01)
(Continued)

(52) U.S. Cl.
CPC ...... *B60R 21/01556* (2014.10); *B60R 21/207* (2013.01); *B60R 21/23138* (2013.01); *B60R 21/233* (2013.01); *B60R 21/2338* (2013.01); *B60R 2021/006* (2013.01); *B60R 2021/01238* (2013.01); *B60R 2021/01286* (2013.01); *B60R 2021/23146* (2013.01); *B60R 2021/23153* (2013.01); *B60R 2021/23308* (2013.01); *B60R 2021/23386* (2013.01)

(58) Field of Classification Search
CPC ........... B60R 21/01556; B60R 21/207; B60R 21/23138; B60R 21/233; B60R 21/2338; B60R 2021/006; B60R 2021/01238; B60R 2021/01286; B60R 2021/23146; B60R 2021/23153; B60R 2021/23308; B60R 2021/23386
See application file for complete search history.

(56) References Cited

U.S. PATENT DOCUMENTS

| 5,492,361 | A | * | 2/1996 | Kim | ............... | B60R 21/207 |
| | | | | | | 280/730.2 |
| 5,730,458 | A | * | 3/1998 | Byon | ............... | B60N 2/79 |
| | | | | | | 280/730.2 |

(Continued)

FOREIGN PATENT DOCUMENTS

WO    19119623 A1    12/1991

*Primary Examiner* — Phutthiwat Wongwian
*Assistant Examiner* — Susan E Scharpf
(74) *Attorney, Agent, or Firm* — Frank A. MacKenzie; Brooks Kushman P.C.

(57) ABSTRACT

A vehicle includes a vehicle seat having a seatback and a seat bottom defining an occupant-seating area. The vehicle includes an airbag housing having a first arm fixed to the seatback and a second arm rotatable from the seatback toward the seat bottom adjacent the occupant-seating area. An airbag extends from the first arm to the second arm. The airbag is fixed to the first arm and the second arm. The vehicle includes a computer including a processor and a memory storing instructions executable by the processor to detect a removeable child-restraint system (CRS) on the occupant-seating area, and based on the detection of the removeable CRS on the occupant-seating area, inflate the airbag in response to detection of certain vehicle impacts.

20 Claims, 8 Drawing Sheets (51) Int. Cl.
   *B60R 21/01*    (2006.01)
   *B60R 21/207*   (2006.01)
   *B60R 21/231*   (2011.01)
   *B60R 21/233*   (2006.01)
   *B60R 21/2338*  (2011.01)

(56) References Cited

U.S. PATENT DOCUMENTS

| | | | | |
|---|---|---|---|---|
| 6,301,977 | B1* | 10/2001 | Stojanovski | G01L 5/103 |
| | | | | 73/862.393 |
| 6,452,870 | B1* | 9/2002 | Breed | B60R 21/0152 |
| | | | | 367/99 |
| 8,047,564 | B2* | 11/2011 | Kibat | B60R 21/23138 |
| | | | | 280/730.2 |
| 9,193,326 | B2* | 11/2015 | Fukawatase | B60R 21/0136 |
| 10,272,865 | B2* | 4/2019 | Nagasawa | B60R 21/18 |
| 10,569,732 | B2* | 2/2020 | Nagasawa | B60R 21/207 |
| 11,110,881 | B1* | 9/2021 | Deng | B60R 21/207 |
| 11,273,783 | B1* | 3/2022 | Faruque | B60R 21/2338 |
| 11,608,020 | B1* | 3/2023 | Wheelwright | B60N 2/79 |
| 12,194,947 | B2* | 1/2025 | Kudou | B60R 21/2338 |
| 2003/0074121 | A1* | 4/2003 | Sakai | B60N 2/268 |
| | | | | 701/45 |
| 2003/0188908 | A1* | 10/2003 | Abe | B60R 21/01516 |
| | | | | 180/282 |
| 2003/0209893 | A1* | 11/2003 | Breed | B60N 2/267 |
| | | | | 701/45 |
| 2014/0327234 | A1* | 11/2014 | Heurlin | B60N 2/2884 |
| | | | | 280/730.1 |
| 2019/0106077 | A1* | 4/2019 | Dry | B60R 21/2334 |
| 2019/0111882 | A1* | 4/2019 | Kim | B60R 21/237 |

* cited by examiner

# AIRBAG ASSEMBLY FOR CHILD-RESTRAINT SYSTEM

BACKGROUND

Vehicles are typically equipped with airbags. In the event of certain impacts, inflators activate and provide inflation medium to the airbags, and the airbags pressurize and act as supplemental restraints for occupants during the impact. The airbags are located at various fixed positions in passenger cabins of vehicles. As examples, vehicles may include a driver airbag mounted in the steering wheel, a passenger airbag mounted in the top of a dash in a vehicle-forward direction from the front passenger seat, and side curtain airbags mounted in the roof rails above the doors.

Child-restraint systems (CRS) are removable seats for seating and restraining children riding in a vehicle. Types of CRSs include rearward facing child seats, forward facing child seats, combination seats that can face rearward or forward, and booster firseats. Rearward facing, forward facing, and combination child seats include a harness for restraining the child occupant. Booster seats rely on the seatbelts included with the vehicle. CRSs may be held in place by the seatbelt of the vehicle and/or may include tethers for attaching to tether attachment brackets of the vehicle.

Vehicles are equipped with anchors for anchoring the CRS to the vehicle. Specifically, the anchor may provide for anchoring of the CRS to a vehicle seat and/or to a body of the vehicle. CRSs include anchoring for connecting the anchor of the vehicle. The anchor of the vehicle and the anchoring system of the CRS may be configured to comply with a standard, e.g., ISOFIX (e.g., ISO216), which is an international standard for attachment points for child safety seats in passenger cars; LATCH ("Lower Anchors and Tethers for Children") in the United States; LUAS ("Lower Universal Anchorage System"); Canfix in Canada; UCSSS ("Universal Child Safety Seat System").

DETAILED DESCRIPTION

A vehicle includes a vehicle seat having a seatback and a seat bottom defining an occupant-seating area. The vehicle includes an airbag housing having a first arm fixed to the seatback and a second arm rotatable from the seatback toward the seat bottom adjacent the occupant-seating area. The vehicle includes an airbag extending from the first arm to the second arm. The airbag is fixed to the first arm and the second arm. The vehicle includes a computer including a processor and a memory. The memory stores instructions executable by the processor to: detect a removeable child-restraint system on the occupant-seating area; and, based on the detection of the removeable child-restraint system on the occupant-seating area, inflate the airbag in response to detection of certain vehicle impacts.

The vehicle may include a second airbag housing spaced from the airbag housing. The occupant-seating area is between the airbag housing and the second airbag housing. The second airbag housing has a first arm fixed to the seatback and a second arm rotatable from the seatback toward the seat bottom. A second airbag extends from the first arm of the second airbag housing to the second arm of the second airbag housing. The second airbag is fixed to the first arm of the second airbag housing and the second arm of the second airbag housing. The memory stores instructions executable by the processor to: based on detection of the removeable child-restraint system on the occupant-seating area, inflate the second airbag in response to detection of certain vehicle impacts.

The vehicle may include a third airbag housing spaced from the second airbag housing. The vehicle seat defines a second occupant-seating area between the second airbag housing and the third airbag housing. The second airbag housing is between the occupant-seating area and the second occupant-seating area. The third airbag housing has a first arm fixed to the seatback and a second arm rotatable from the seatback toward the seat bottom. A third airbag extends from the first arm of the second airbag housing to the second arm of the third airbag housing. The third airbag is fixed to the first arm of the third airbag housing and the second arm of the third airbag housing. The memory stores instructions executable by the processor to: based on the detection of the removeable child-restraint system on the second occupant-seating area, inflate the second airbag and the third airbag in response to detection of certain vehicle impacts.

The vehicle may include a fourth airbag housing spaced from the third airbag housing. The vehicle seat defines a third occupant-seating area between the third airbag housing and the fourth airbag housing. The third airbag housing is between the second occupant-seating area and the third occupant-seating area. The fourth airbag housing has a first arm fixed to the seatback and a second arm rotatable from the seatback toward the seat bottom. A fourth airbag extends from the first arm of the fourth airbag housing to the second arm of the fourth airbag housing. The fourth airbag is fixed to the first arm of the fourth airbag housing and the second arm of the fourth airbag housing. The memory stores instructions executable by the processor to: based on the detection of the removeable child-restraint system on the third occupant-seating area, inflate the third airbag and the fourth airbag in response to detection of certain vehicle impacts.

The memory may store instructions executable by the processor to maintain an airbag in an uninflated position based on detection of an adult occupant in the occupant-seating area in response to detection of certain vehicle impacts.

The airbag is inflatable from an uninflated position to an inflated position. The airbag may rotate the second arm toward the seat bottom from the uninflated position to the inflated position.`

The second arm may extends along the first arm in an undeployed position and the second arm extends transverse the first arm in a deployed position.

The vehicle seat may include a bracket on the seat bottom. The second arm is engaged with the bracket when the second arm is in a deployed position.

The vehicle may include a plurality of external tethers extending from the first arm to the second arm when the airbag is inflated in an inflated position. The plurality of external tethers may be attached to the first arm, the second arm, and the airbag. The external tethers may be under tension between the first arm and second arm when the airbag is in the inflated position. The external tethers may be a reaction surface for the airbag in the inflated position. The external tethers may be uninflatable.

The vehicle may include an inflator in fluid communication with the airbag. The inflator may be fixed to the airbag housing.

The vehicle may include a hinge between the first arm and the second arm. The hinge may be a locking hinge.

With reference to the figures, wherein like numerals indicate like parts throughout the several views, a vehicle 10 is generally shown. The vehicle 10 includes a vehicle seat 12 having a seatback 14 and a seat bottom 16 defining an occupant-seating area 18. The vehicle 10 includes an airbag housing 20 having a first arm 22 fixed to the seatback 14 and a second arm 24 rotatable from the seatback 14 toward the seat bottom 16 adjacent the occupant-seating area 18. An airbag 26 extends from the first arm 22 to the second arm 24. The airbag 26 is fixed to the first arm 22 and the second arm 24. The vehicle 10 includes a computer 28 including a processor and a memory storing instructions executable by the processor to detect a removeable child-restraint system (CRS 30) on the occupant-seating area 18, and based on the detection of the removeable CRS 30 on the occupant-seating area 18, inflate the airbag 26 in response to detection of certain vehicle impacts.

In the event of detection of certain vehicle impacts and detection of the presence of a removable CRS 30 on the occupant-seating area 18, the second arm 24 is deployed from an undeployed position to a deployed position, as described further below. The airbag 26 is in an uninflated position when the second arm 24 is in the undeployed position and the airbag 26 is inflatable to the inflated position. The airbag 26 is inflated at a time so that the airbag 26 is in the inflated position when the second arm 24 is in the deployed position. The second arm 24 in the deployed position is an anchor for the airbag 26. When the second arm 24 is in the deployed position and the airbag 26 is in the inflated position, the airbag 26 controls the kinematics of the removable CRS 30 and/or an occupant of the CRS 30.

In the example shown in the figures, the vehicle seat 12 includes three occupant-seating areas 18, namely a first occupant-seating area 18, 34, a second occupant-seating area 18, 36, and a third occupant-seating area 18, 38. The vehicle 10 in the example shown in the figures includes four airbag assemblies 40, 42, 44, 46, 48, namely a first airbag assembly 40, 42, a second airbag assembly 40, 44, a third airbag assembly 40, 46, and a fourth airbag assembly 40, 48. As described further below, each airbag assembly 40 includes an instance of the airbag 26 (namely a first airbag 26, 50, a second airbag 26, 52, a third airbag 26, 53, and a fourth airbag 26, 55), the first arm 22, and the second arm 24. The airbag assemblies 40, 42, 44, 46, 48 are independently deployable, as described further below, based on occupancy of the vehicle seat 12 by a CRS 30. The numerical adjectives first, second, third, fourth, etc., are used herein merely as identifiers and do not indicate order or importance.

Figure 1:
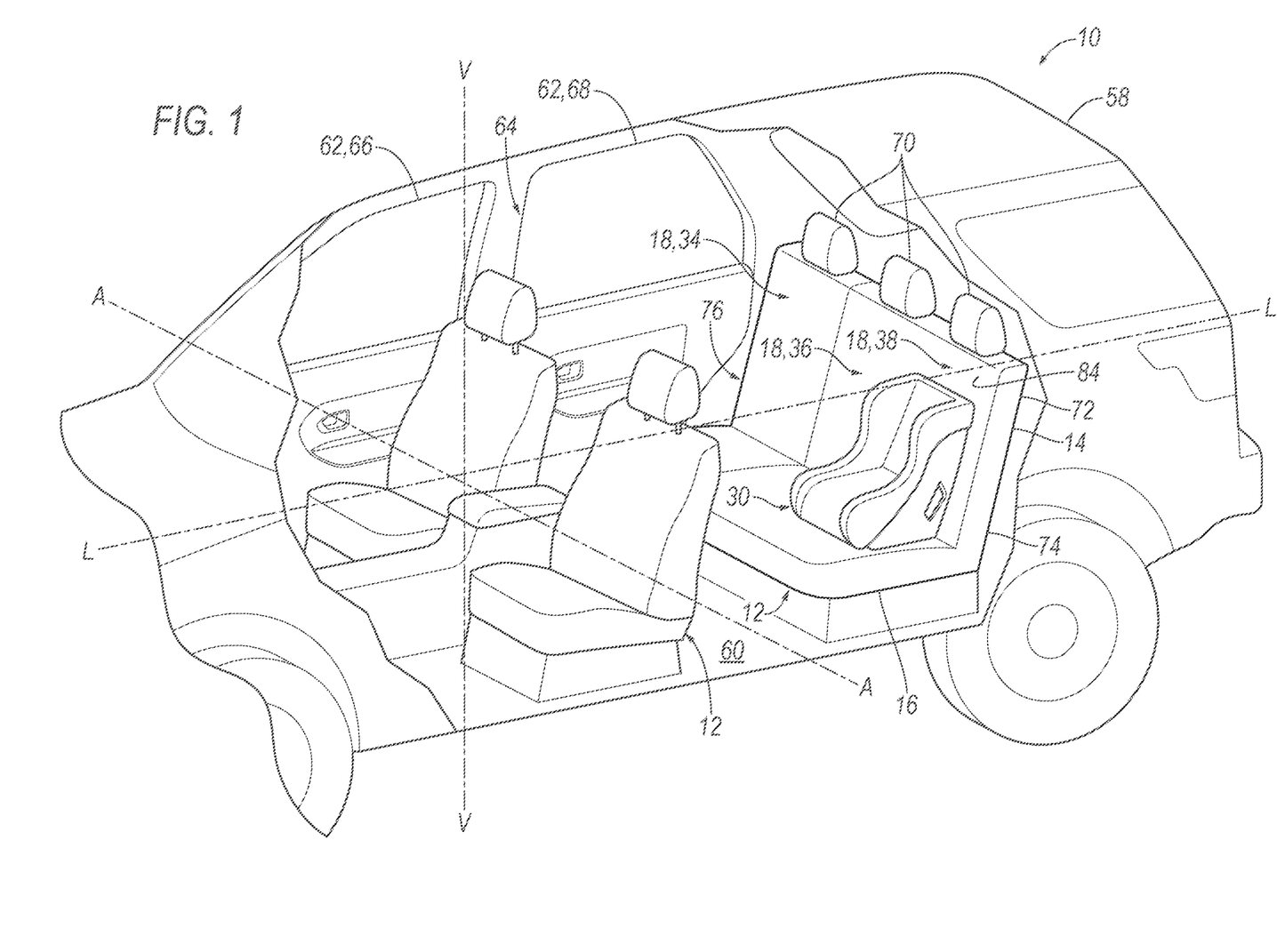
FIG. 1 is a perspective view of a vehicle including a seat and a removable child-restraint system (CRS) installed on the seat.

With reference to FIG. 1, the vehicle 10 may be any type of passenger or commercial automobile such as a car, a truck, a sport utility vehicle 10, a crossover, a van, a minivan, a taxi, a bus, etc. With reference to FIG. 1, the vehicle 10 defines a vehicle-longitudinal axis L extending between a front end (not numbered) and a rear-end (not numbered) of the vehicle 10. The vehicle 10 defines a vehicle-lateral axis A extending cross-vehicle from one side to the other side of the vehicle 10. The vehicle 10 defines a vertical axis V. The vehicle-longitudinal axis L, the vehicle-lateral axis A, and the vertical axis V are perpendicular relative to each other.

The vehicle 10 includes a vehicle body 58 defining a passenger cabin (not numbered) to house occupants of the vehicle 10. The vehicle body 58 may include a vehicle roof (not numbered) and a vehicle floor 60 with the vehicle roof defining an upper boundary of the passenger cabin and the vehicle floor 60 defining a lower boundary of the passenger cabin. The vehicle body 58 includes vehicle doors 62 openable to allow ingress to and egress from the passenger cabin. The passenger cabin may extend across the vehicle 10, i.e., from one side to the other side of the vehicle 10. The passenger cabin includes a front end (not numbered) and a rear end (not numbered) with the front end being in front of the rear end along the longitudinal axis L during forward movement of the vehicle 10.

The vehicle body 58 includes a body side. Specifically, the vehicle body 58 includes two body sides spaced cross vehicle from each other. The body side is a side of the body located vehicle-outboard of the passenger cabin. The body sides may be spaced cross-vehicle from each other along the vehicle-lateral axis A and may be elongated along the longitudinal axis L. The body side includes one or more door openings (not numbered). The vehicle floor 60 extends from one body side to the other body side and the vehicle roof extends from one body side to the other body side. The vehicle body 58, specifically each body side, may include pillars. In some examples, the pillars on the same body side are separated by one of the door openings. The vehicle 10 may include any suitable number of pillars on either body side. The pillars may extend from the roof to the vehicle floor 60.

With reference to FIG. 1, the vehicle 10 includes vehicle doors 62 openable for occupants to enter and exit the passenger cabin. In the example shown in the Figures, the vehicle 10 includes a front door 62, 66 and a rear door 62, 68 on each body side. The front door 62, 66 is vehicle-forward of the rear door 62, 68 along the longitudinal axis L of the vehicle 10.

The vehicle 10 includes one or more vehicle seats 12. Specifically, the vehicle 10 may include any suitable number of vehicle seats 12. The vehicle seats 12 are supported by the vehicle floor 60. The vehicle seats 12 may be arranged in any suitable arrangement in the passenger cabin. One or more of the vehicle seats 12 may be at the front end of the passenger cabin, e.g., in a front row. One or more of the vehicle seats 12 may be behind the front end of the passenger cabin, e.g., at the rear end of the passenger cabin as a rear row 76. In the example shown in the Figures, the vehicle 10 includes the vehicle seat 12 arranged as a rear row 76. Specifically, the vehicle seat 12 of the rear row 76 includes three occupant-seating areas 18. In other examples, the seat of the rear row 76 may include any suitable number of occupant-seating areas 18. The rear row 76 may be, in some examples, a second row or a third row. The vehicle seats 12 may be of any suitable type, e.g., a bucket seat, bench seat, etc.

Each of the vehicle seats 12 include the seatback 14 and the seat bottom 16. The vehicle seat 12 may include a head restraint 70. The head restraint 70 may be supported by and extend upwardly from the seatback 14. The head restraint 70 may be stationary or movable relative to the seatback 14. The seatback 14 may be supported by the seat bottom 16 and may be stationary or movable relative to the seat bottom 16. The seatback 14 may extend from an upper end 72 to a lower end 74. The lower end 74 may be connected to the seat bottom 16. The upper end 72 of the seatback 14 may be spaced upwardly from the lower end 74 of the seatback 14, i.e., upwardly from the seat bottom 16. The head restraint 70 may extend upwardly from the upper end 72 of the seatback 14. The seatback 14, the seat bottom 16, and the head restraint 70 may be adjustable in multiple degrees of freedom.

With continued reference to FIG. 1, each vehicle seat 12 defines a seat-forward direction along a seat-forward axis A1. The seat-forward direction D1 extends forward relative to the vehicle seat 12. For example, the seat-forward direction D1 may extend from a rear of the vehicle seat 12 to a front of the vehicle seat 12 relative to an occupant 32 of the vehicle seat 12, i.e., the occupant of the vehicle seat 12 faces in the seat-forward direction D1. In other words, the seat bottom 16 extends from the seatback 14 in the seat-forward direction D1. The vehicle seat 12 defines a cross-seat axis A2 and a seat-upright axis A3. The seat-forward axis A1, the cross-seat axis A2, and the seat-upright axis A3 are perpendicular to each other. In the example shown in the figures, the seat of the rear row 76 includes three occupant-seating areas 18 positioned along the cross-seat axis A2.

Figure 2:
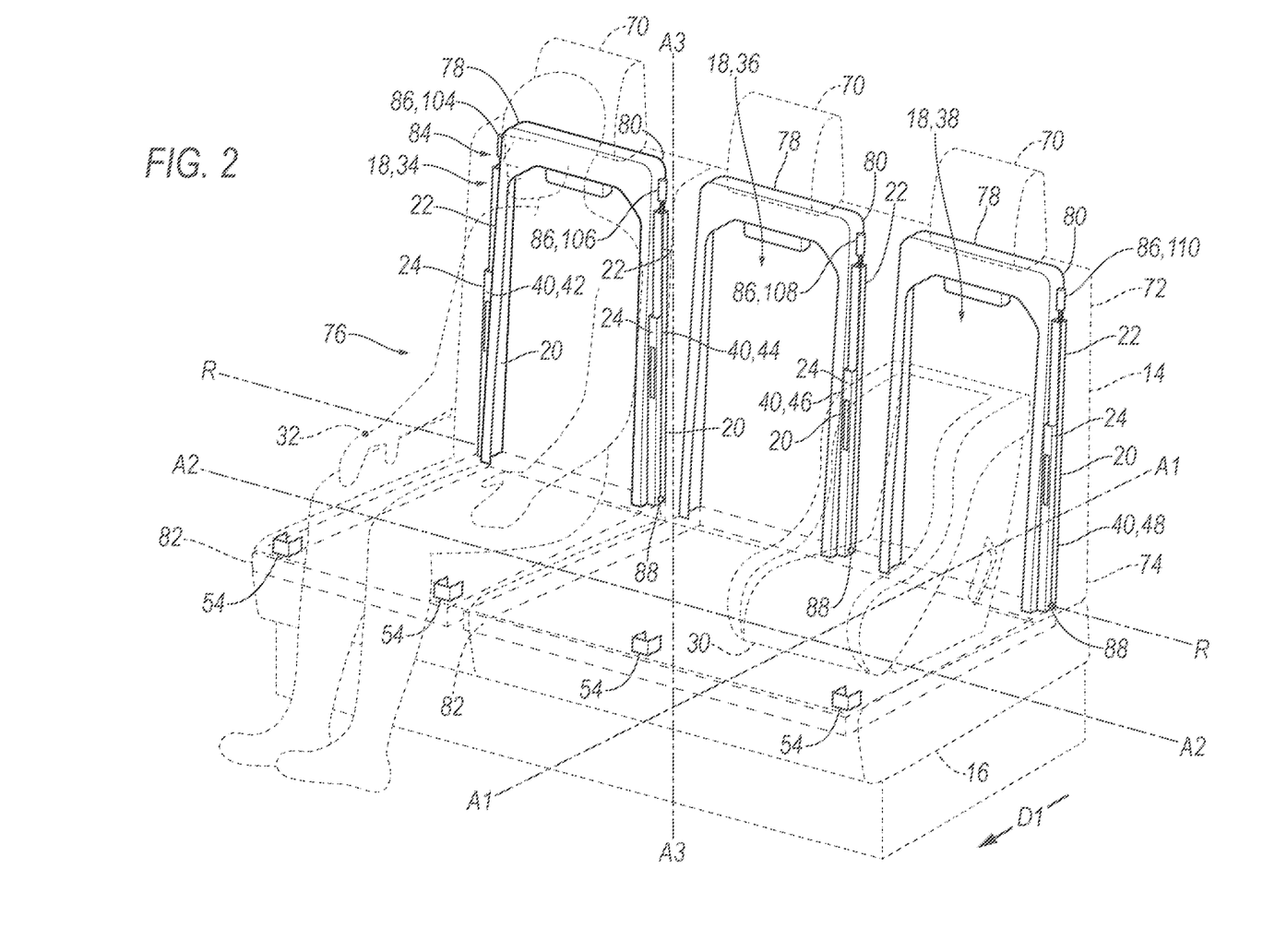
FIG. 2 is a perspective view of the seat with an occupant on the seat and with a CRS installed on the seat with four airbag assemblies each in an undeployed position.

With reference to FIG. 2, the vehicle seat 12 includes a seat frame 78. The seat frame 78 includes a seatback frame 80 and the seat bottom 16 includes a seat bottom frame 82, i.e., the seatback 14 includes the seatback frame 80 and the seat bottom 16 includes the seat bottom frame 82. The seat frame 78 may include panels and/or may include tubes, beams, etc. The seat frame 78 may be of any suitable plastic material (e.g., carbon fiber reinforced plastic (CFRP), glass fiber-reinforced semi-finished thermoplastic composite (organosheet), etc.), a suitable metal (e.g., steel, aluminum, etc.), etc.

The vehicle seat 12 includes a covering 84 supported on the seat frame 78. The covering 84 may be cloth, leather, faux leather, or any other suitable material. The seat may include padding material between the covering 84 and the seat frame 78. The padding material may be foam or any other suitable material. The cover may be stitched in panels around the seat frame 78 and padding material. The covering 84 may include a tear seam (not numbered) associated with each airbag assembly 40. The airbag assembly 40, specifically, the second arm 24 and the airbag 26, may extend through the tear seam as the airbag assembly 40 moves from the undeployed position to the deployed position. The tear seam may be designed to tear apart when subjected to a tensile force above a threshold magnitude. In other words, the covering 84 on one side of the tear seam separates from the covering 84 on the other side of the tear seam when the force is above the threshold magnitude. The threshold magnitude may be chosen to be greater than forces from, e.g., inadvertent pushing against the seat by an occupant 32 but be less than forces from the deployment of the airbag 26. The tear seam may be, for example, a line of perforations through the covering 84, a line of thinner covering 84 material than the rest of the covering 84, etc.

Figure 4:
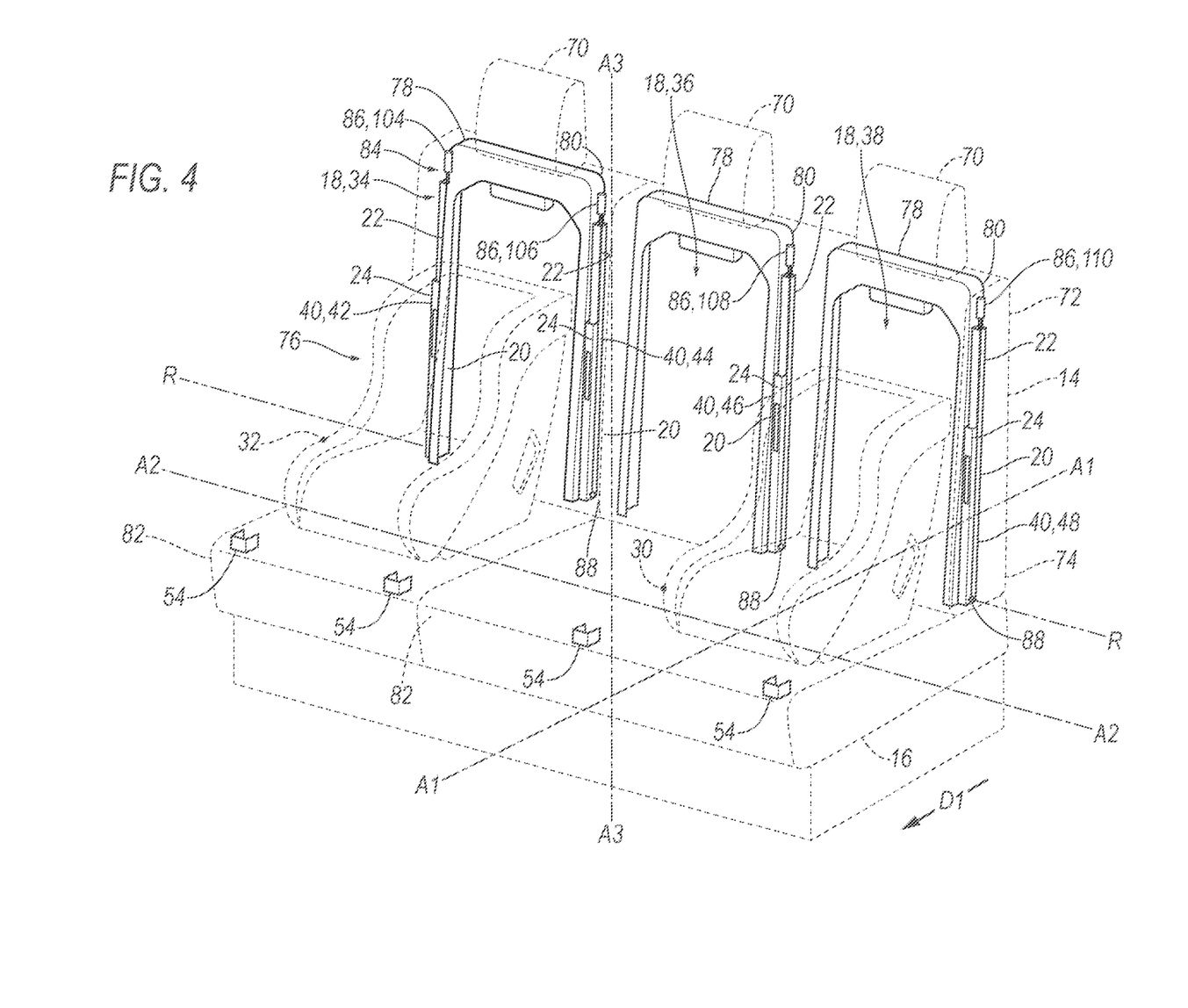
FIG. 4 a perspective view of the seat with two CRS's installed on the seat with four airbag assemblies each in the undeployed position.
Figure 5:
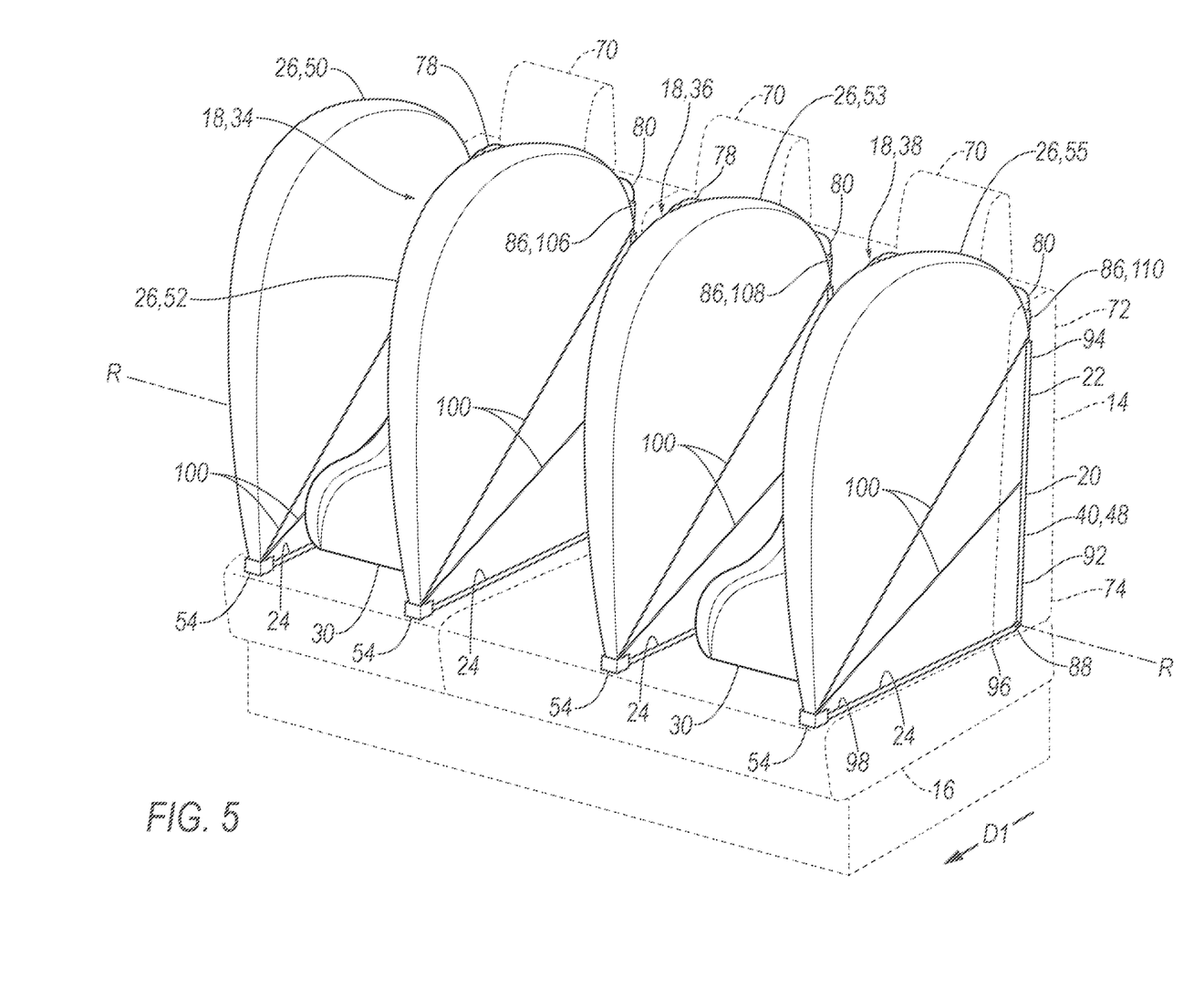
FIG. 5 a perspective view of the seat with two CRS's installed on the seat with the four airbag assemblies each in the deployed position.
Figure 6:
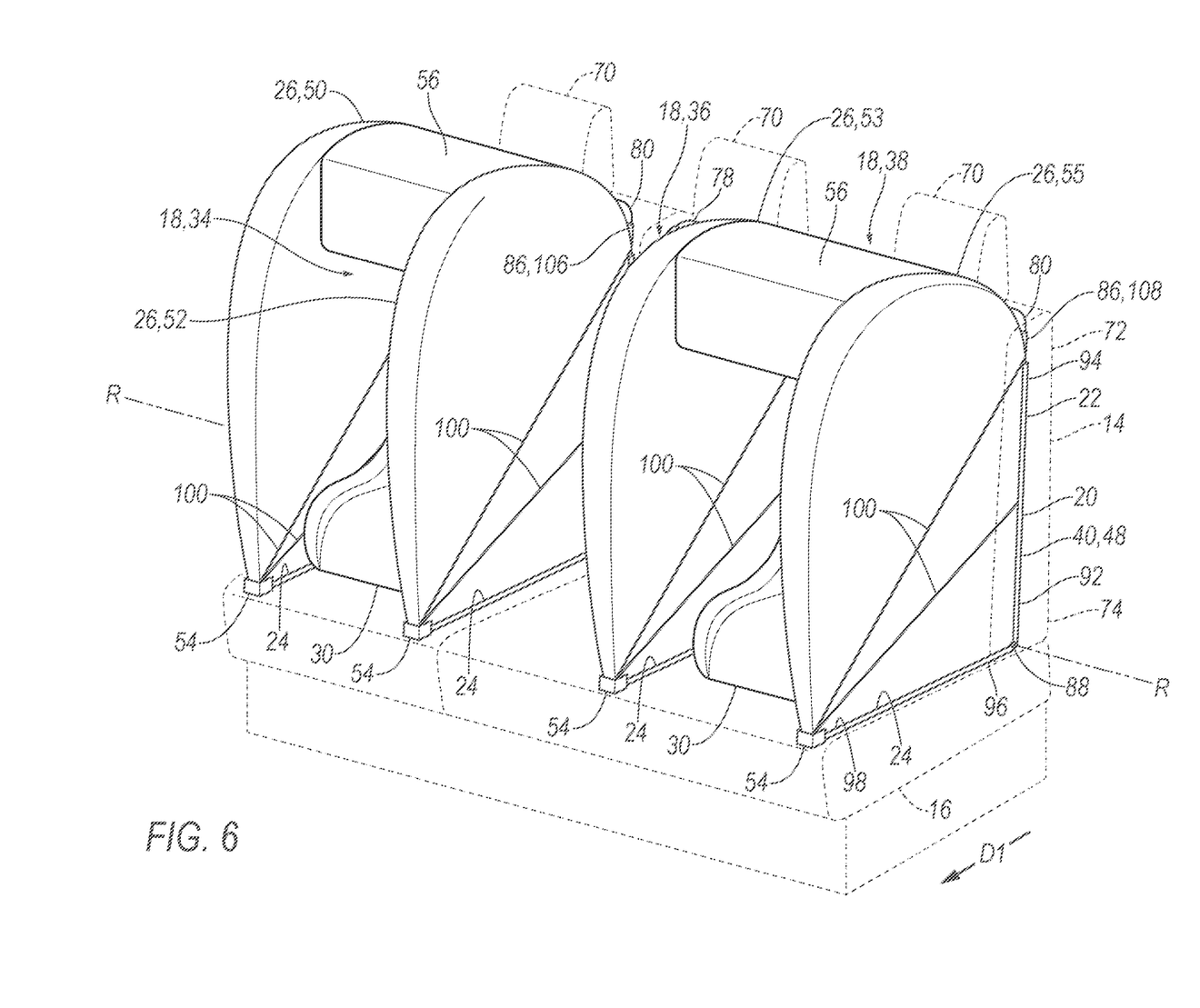
FIG. 6 a perspective view of the seat with two instances of another example airbag assembly each in the deployed position.

The seatback 14 may define at least one occupant-seating area. The occupant-seating area is the space occupied by an occupant 32 properly seated on the seat. The occupant-seating area is seat-forward of the seatback 14 and above the seat bottom 16. As set forth above, in the example shown in the figures, the seat includes the first occupant-seating area 18, 34, the second occupant-seating area 18, 36, and the third occupant-seating area 18, 38. The three occupant-seating areas 18 are positioned adjacent each other along the cross-seat axis A2. Each occupant-seating area 18 is designed to directly support an occupant 32 and to alternatively support a CRS 30. For example, in the example shown in FIGS. 2-3, the first occupant-seating area 18, 34 supports an adult occupant and the third occupant-seating area 18, 38 supports a CRS 30. As another example, in the examples in FIGS. 4-6, the first occupant-seating area 18, 34 supports a CRS 30 and the third occupant-seating area 18, 38 supports another CRS 30.

CRSs 30 are designed to control kinematics of a child, e.g., a human having a certain, age, height, weight, etc., during certain vehicle impacts. The CRS 30 is configured for installation in the vehicle 10. When installed in the vehicle 10, the CRS 30 is supported by the vehicle seat 12. For example, the CRS 30 may sit atop the seat bottom 16 and abut the seatback 14. As shown in the example in the figures, the CRS 30 may be installed in a forward-facing orientation, i.e., in which the occupant of the CRS 30 faces a front of the vehicle 10. In other examples, the CRS 30 may be installed in a rearward-facing orientation, i.e., in which the occupant of the CRS 30 faces a rear of the vehicle 10.

A CRS 30 is designed to receive a child. The CRS 30 may include a seating portion having a bottom and a back, e.g., for a child to sit on and recline against. The CRS 30 may include a base supporting the seating portion. The base may be below the bottom and/or behind the back of the CRS 30. The bottom and/or back may pivot relative to the base, e.g., to change an angle of the bottom and/or back of the CRS 30 relative to the vehicle seat 12 supporting the CRS 30. The bottom and/or the back may be upholstered, padded, etc. The base may be rigid relative to the bottom and/or the back. For example, the base may be of rigid material including material types such as plastic, metal, etc.

The CRS 30 may be configured to comply with a standard. As an example, the CRS 30 may be configured to comply with ISOFIX (e.g., ISO216), which is an international standard for attachment points for CRSs 30 in passenger cars. In addition or as other examples, the CRS 30 may be configured to comply with LATCH ("Lower anchors and Tethers for Children") in the United States, LUAS ("Lower Universal Anchorage System") or Canfix in Canada, and/or UCSSS ("Universal Child Safety Seat System").

The CRS 30 is removeable from the seat 12. In other words, the CRS 30 may be installed to the vehicle seat 12 at one of the occupant-seat areas for use by an occupant 32 of the CRS 30 and may be uninstalled from the seat 12 so that the occupant-seating area 18 is open for use by another occupant, e.g., an adult occupant 32 as shown in the examples in FIGS. 2 and 3. The vehicle 10 and/or the seat is designed to connect to the CRS 30 to install the CRS 30 to the seat. As an example, the vehicle 10 includes the anchor that is designed to be connected to a CRS 30 when the CRS 30 is installed in the vehicle 10. Specifically, the CRS 30 includes a connection point that is connectable to the anchor to install the child restraint system. The connection point may be a clip, e.g., a clip with an open loop and flexible gate, an "alligator" style clip defining a slot with a button actuated latch, or any other suitable configuration for connecting to the respective anchor, including in some examples that are currently known. The connection point may be configured for attachment to the anchor that meets a standard, e.g., ISOFIX, LATCH, LUAS, UCSSS, etc. For example, a CRS 30 can have a strap and a clip that is connectable to the anchor. The CRS 30 may include further attachment points that connect to other features of the vehicle 10, e.g., other portions of the seat or vehicle body 58 such as anchors meeting a standard, ISOFIX, LATCH, LUAS, UCSSS, etc., including in some examples those that are currently known.

The vehicle 10 includes at one airbag assembly 40. As set forth above, in the example shown in the figures, the vehicle 10 includes the first airbag assembly 40, 42, the second airbag assembly 40, 44, the third airbag assembly 40, 46, and the fourth airbag assembly 40, 48. In other examples, the vehicle 10 may include any suitable number of airbag assemblies 40, i.e., one or more. Common numerals are used to identify common features among the various airbag assemblies 40.

Figure 3:
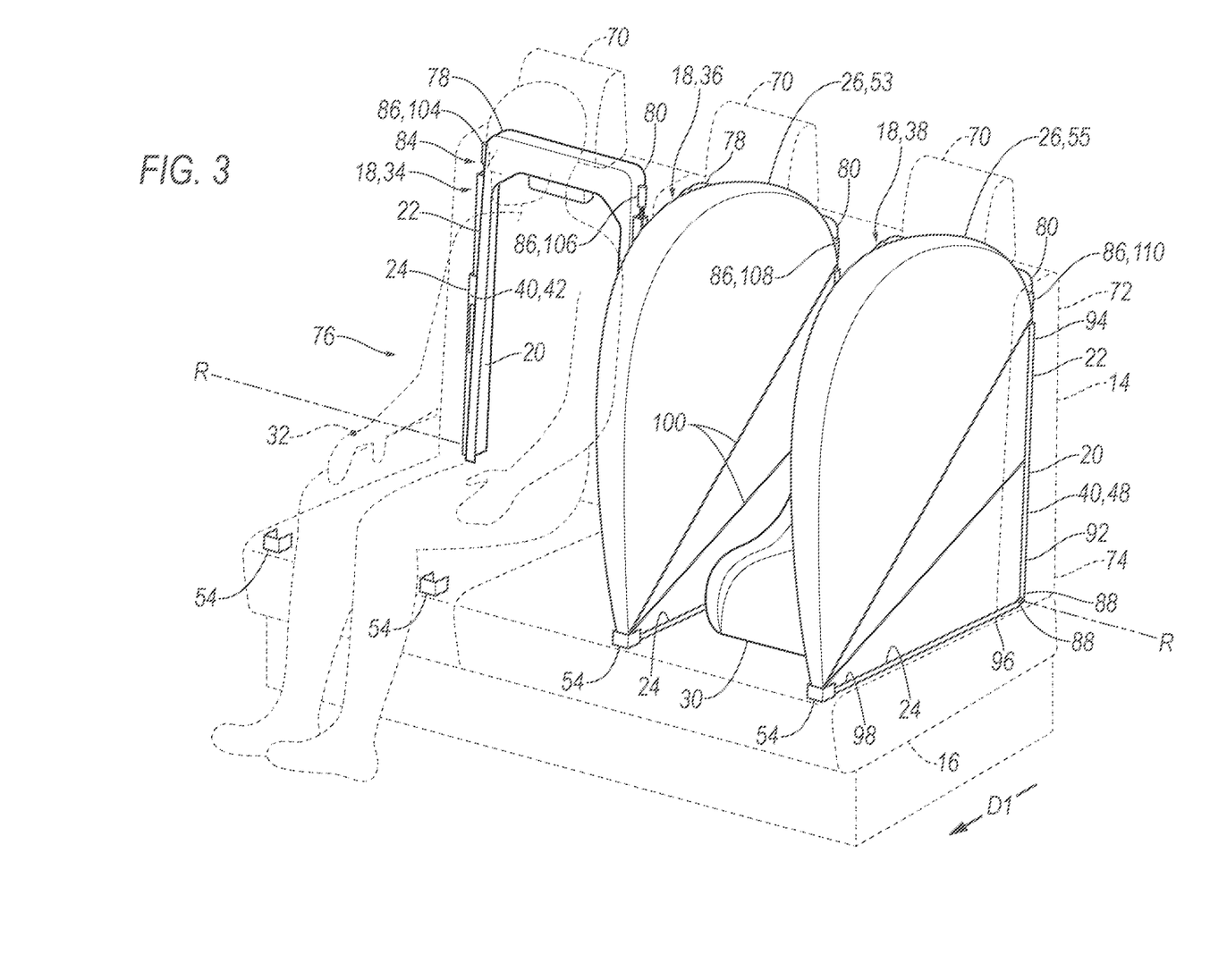
FIG. 3 a perspective view of the seat with an occupant on the seat and with a CRS installed on the seat with two of the airbag assemblies in a deployed position.

The airbag assembly 40 includes the airbag housing 20, the airbag 26, and an inflator 86. The inflator 86 inflates the airbag 26 from the uninflated position to the inflated position, which moves the second arm 24 from the undeployed position to the deployed position. The airbag housing 20 includes the first arm 22 fixed to the seatback 14 and the second arm 24 rotatable from the seatback 14 toward the seat bottom 16 adjacent the occupant-seating area 18. The airbag 26 extends from the first arm 22 to the second arm 24. The airbag 26 is fixed to the first arm 22 and the second arm 24. When the airbag 26 is inflated, the airbag 26 forces the second arm 24 to rotate relative first arm 22 and the seatback 14 from the undeployed position to the deployed position. Specifically, the airbag 26 forces the second arm 24 to rotate toward the seat bottom 16 to the deployed position. As an example, the four airbag assemblies 40, 42, 44, 46, 48 are in the undeployed position in FIG. 2. In FIG. 3, the third airbag assembly 40, 46 and the fourth airbag assembly 40, 48 are in the deployed position. In the examples shown in FIGS. 5 and 6, all four airbag assemblies 42, 44, 46, 48 are in the deployed position. The airbag assemblies 42, 44, 46, 48 are selectively deployed from the undeployed position to the deployed position, as described further below.

With reference to FIG. 2, the housings 20 of the four airbag assemblies 42, 44, 46, 48 are spaced from each other along the vehicle-lateral axis A. In the example shown in the figures, the first airbag assembly 40, 42 is at one of the body sides and the fourth airbag assembly 40, 48 is at the other of the body sides. The second airbag assembly 40, 44 is spaced from the first airbag assembly 40, 42 with the first occupant-seating area 18, 34 therebetween. The third airbag assembly 40, 46 is spaced from the second airbag assembly 40, 44 with the second occupant-seating area 18, 36 therebetween. The fourth airbag assembly 40, 48 is spaced from the third airbag assembly 40, 46 with the third occupant-seating area 18, 38 therebetween. Specifically, the housing 20 of the second airbag assembly 40, 44 is spaced from the housing 20 of the first airbag assembly 40, 42 with the first occupant-seating area 18, 34 therebetween; the housing 20 of the third airbag assembly 40, 46 is spaced from the housing 20 of the second airbag assembly 40, 44 with the second occupant-seating area 18, 36 therebetween; and the housing 20 of the fourth airbag assembly 40, 48 is spaced from the housing 20 of the third airbag assembly 40, 46 with the third occupant-seating area 18, 38 therebetween. When the respective airbag assemblies 40, 42, 44, 46, 48 are in the deployed position, the first occupant-seating area 18, 34 is between the airbag 26/second arm 24 of the first airbag assembly 40, 42 and the airbag 26/second arm 24 of the second airbag assembly 40, 44; the second occupant-seating area 18, 36 is between the airbag 26/second arm 24 of the second airbag assembly 40, 44 and the airbag 26/second arm 24 of the third airbag assembly 40, 46; and the third occupant-seating area 18, 38 is between the airbag 26/second arm 24 of the third airbag assembly 40, 46 and the airbag 26/second arm 24 of the fourth airbag assembly 40, 48.

The airbag housing 20 may include a joint 88 between the first arm 22 and the second arm 24, as shown in the Figures. The first arm 22 meets the second arm 24 at the joint 88. The joint 88 is a rotatable joint 88. In other words, the first arm 22 and second arm 24 are rotatably connected to each other at the joint 88. In such an example, the joint 88 may define a rotational axis R. The rotational axis R is parallel or generally parallel to the cross-seat axis A2.

The joint 88 may, for example, be a hinge 88 between the first arm 22 and the second arm 24. The hinge 88 may be a locking hinge 88. In such examples, the locking hinge 88 releasably retains the second arm 24 in the deployed position. The locking hinge 88 may include a lock (not shown) that releasably engages the second arm 24 and the first arm 22 to prevent relative rotation. The lock may be, for example, a spring, a retractable pin, an electromagnet, etc.

The first arm 22 is fixed to the seatback 14, e.g., the seat frame 78, as shown in FIG. 2. In some examples, including the example shown in the figures, the first arm 22 is fixed directly to the seatback frame 80. In such examples, the first arm 22 abuts the seatback frame 80. The first arm 22 may be fixed to the seatback frame 80 with, for example locating elements, fasteners, etc., that engage the seatback 14.

With continued reference to FIG. 2, the first arm 22 includes a proximal end 92 and a distal end 94 spaced from each the proximal end 92. The joint 88 is disposed at the proximal end 92 of the first arm 22. That is, the distal end 94 of the first arm 22 is spaced from the rotational axis R. The first arm 22 is elongated from the proximal end 92 to the distal end 94, e.g., along the seatback 14. In other words, the longest dimension of the first arm 22 is from the proximal end 92 to the distal end 94.

The second arm 24 includes a proximal end 96 and a distal end 98 spaced from the proximal end 96. The joint 88 may be disposed at the proximal end 96 of the second arm 24. In other words, the proximal ends 92, 96, of the first and second arms 24, may be rotatably connected to each other via the joint 88. The distal end 98 of the second arm 24 is spaced from the rotational axis R. The distal end 98 of the second arm 24 is rotatable about the rotational axis R.

With continued reference to FIG. 2, the second arm 24 is elongated from the proximal end 96 to the distal end 98. In other words, the longest dimension of the second arm 24 is from the proximal end 96 to the distal end 98. The second arm 24 may be elongated a different amount than the first arm 22. For example, the ends 96, 98, of the second arm 24 may be spaced from each other by an amount less than the ends 92, 94, of the first arm 22. In other words, the second arm 24 may be shorter than the first arm 22.

The second arm 24 is rotatable relative to the first arm 22 and the seatback 14 from the undeployed position to the deployed position when the airbag 26 inflates. In the undeployed position, the airbag housing 20, i.e., the first arm 22 and the second arm 24, may be disposed in the seatback 14, e.g., between the covering 84 and the seat frame 78. In other words, the covering 84 may cover the airbag housing 20 when the second arm 24 is in the undeployed position. In the undeployed position, the second arm 24 is elongated along the first arm 22. The distal ends 94, 98, of the first and second arms 24, may be spaced from each other when the second arm 24 is in the undeployed position, as shown in FIG. 2. In the undeployed position, the first arm 22 and the second arm 24 define a cavity therebetween that houses the airbag 26. As the airbag 26 inflates toward the inflated position, the second arm 24 rotates about the rotational axis R thus breaking through the tear seam and moving the second arm 24 to the deployed position. That is, inflation of the airbag 26 forces the second arm 24 to rotate to the deployed position.

In the deployed position, the second arm 24 and the airbag 26 may extend through the seatback 14, e.g., the tear seam adjacent to the airbag housing 20. In the deployed position, the second arm 24 is elongated transverse to the first arm 22. Specifically, the first arm 22 is elongated along the seatback 14 and the second arm 24 is elongated along the seat bottom 16, i.e., in the seat-forward direction D. In this situation, the second arm 24 may extend outwardly from the seatback 14, e.g., in the seat-forward direction D1. In such an example, the second arm 24 may be disposed adjacent to the seat bottom 16 and may abut the seat bottom 16.

With reference to FIGS. 3-6, the second arm 24 and the seat may lock with each other in a fixed position when the second arm 24 is in the deployed position. For example, the vehicle seat 12 may include a bracket 54 fixed to the seat frame 78 at the seat bottom 16. The bracket 54 may have a U-shape. The second arm 24 is selectively engageable with the bracket 54 in the deployed position. Specifically, the distal end 98 of the second arm 24 engages the bracket 54 and locks 90 into the U-shape of the bracket 54 in the deployed position. The engagement of the second arm 24 with the bracket 54 prevents the second arm 24 from moving along the cross-seat axis A2. The bracket 54 may be covered by the covering 84 of the seat 12. When engaging the bracket 54, the distal end 98 may compress the covering 84 of the seat bottom 16 into the bracket 54.

The airbag housing 20 houses the airbag 26 in the uninflated position. In other words, the airbag 26 is enclosed between the first arm 22 and the second arm 24 in the uninflated position, as shown in FIG. 2. The airbag 26 may be folded and/or rolled in the airbag housing 20 when the airbag 26 is in the uninflated position. As described below, the airbag 26 expands from and is supported by the airbag housing 20 as the airbag 26 inflates from the uninflated position to the inflated position. The housing may be of any suitable type and construction, e.g., a polymer, a composite, a combination of rigid materials, etc.

The airbag 26 may be of any suitable airbag 26 material, e.g., from a woven polymer. For example, the airbag 26 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc. The airbag 26 may be a single continuous unit, e.g., a single piece of fabric. Alternatively, the airbag 26 may include a plurality of segments, i.e., two or more. The segments may be attached to each other in any suitable fashion, e.g., a plurality of panels attached by stitching, ultrasonic welding, etc.

As set forth above, the airbag 26 is inflatable from the uninflated position to the inflated position. In the uninflated position, the airbag 26 may be disposed in the airbag housing 20, e.g., between the first arm 22 and the second arm 24, as shown in FIG. 2. In other words, the airbag housing 20 may cover the airbag 26 in the uninflated position. During inflation, the airbag 26 may force the second arm 24 to rotate relative to the first arm 22 and the seatback 14 to the deployed position. In the inflated position, the airbag 26 extends along the respective occupant-seating area 18 adjacent the respective occupant-seating area 18, e.g., in the seat-forward direction D1 and along the vertical axis V of the seat, between the occupant-seating area 18 and another seat, i.e., inboard of the occupant-seating area 18. In the inflated position, the airbag 26 may extend next to the occupant-seating area 18 to control occupant kinematics.

With reference to FIGS. 3-6, the airbag 26 extends from the first arm 22 to the second arm 24. For example, the airbag 26 may extend along the first arm 22 from the second arm 24 towards the distal end 94 of the first arm 22, and the airbag 26 may extend along the second arm 24 from the first arm 22 towards the distal end 98 of the second arm 24. As one example, the airbag 26 may extend to the distal end 94 of the first arm 22 and/or to the distal end 98 of the second arm 24. As another example, the airbag 26 may be spaced from the distal end 94 of the first arm 22 and/or from the distal end 98 of the second arm 24. The airbag 26 may be disposed adjacent to the seatback 14 and the seat bottom 16 in the inflated position.

As set forth above, the airbag 26 is fixed to the first arm 22 and the second arm 24. In other words, the airbag 26 is anchored to the first arm 22 and moves with the second arm 24 as the second arm 24 rotates relative to the first arm 22 from the undeployed position to the deployed position. The airbag 26 may, for example, be fixed along the first arm 22, e.g., from the second arm 24 towards the distal end 94 of the first arm 22. As another example, the airbag 26 may be fixed to the first arm 22 at specific locations along the first arm 22. As one example, the airbag 26 may be fixed to the distal end 94 of the first arm 22. Additionally, the airbag 26 may, for example, be fixed along the second arm 24, e.g., from the first arm 22 towards the distal end 98 of the second arm 24. As another example, the airbag 26 may be fixed to the second arm 24 at specific locations along the second arm 24. As one example, the airbag 26 may be fixed to the distal end 98 of the second arm 24. The airbag 26 may, for example, be fixed to the first arm 22 and the second arm 24 via stitching, ultrasonic welding, etc.

The first arm 22 and the second arm 24 are rigid relative to the airbag 26 in the inflated position to provide a reaction surface to the airbag 26. Specifically, since the airbag 26 extends from the first arm 22 to the second arm 24 and is fixed to the first arm 22 and the second arm 24, the first arm 22 and the second arm 24 position the airbag 26 along the cross-seat axis A2.

At least one of the airbag assemblies 40 includes an upper chamber 56 disposed above an occupant-seating area 18. In the example shown in FIG. 6, one upper chamber 56 is above the first occupant-seating area 34 and another upper chamber 56 is above the third occupant-seating area 38. The upper chamber 56 above the first occupant-seating area 34 is supported by and inflatable by at least one of the first airbag 50 and the second airbag 52. Similarly, the upper chamber 56 above the third occupant-seating area 38 is supported by and inflatable by at least one of the third airbag 53 and the fourth airbag 55. In some examples, the upper chamber 56 is supported by and inflatable by two airbags 18, in which case both airbags 18 are simultaneously deployed.

The airbag assembly 40 may include one or more external tethers 100 extending from the first arm 22 to the second arm 24. The external tether 100 is external to an inflation chamber of the airbag 26, i.e., the tether 100 is external. The external tethers 100 may be attached to the first arm 22 and the second arm 24. The external tethers 100 may be attached at any suitable location along the first arm 22. For example, one external tether 100 may be attached to the distal end 94 of the first arm 22 and another external tether 100 may be attached to the first arm 22 at a location between the joint 88 and the distal end 94 of the first arm 22, as shown in the Figures. Similarly, the external tethers 100 may be attached at any suitable location along the second arm 24. For example, the external tethers 100 may be attached to the distal end 98 of the second arm 24. The external tethers 100 may be attached to the first arm 22 and the second arm 24, e.g., via stitching, ultrasonic welding, etc.

The external tethers 100 may, for example, be attached to the airbag 26. The external tethers 100 may be attached to the airbag 26 along an axis defined by the external tether 100 and extending from the first arm 22 to the second arm 24. The external tethers 100 may be attached to the airbag 26, e.g., via stitching, ultrasonic welding, etc. As another example, the external tethers 100 may be disconnected from the airbag 26. The external tethers 100 may be any suitable material. For example, the external tethers 100 may be the same type of material as the airbag 26.

The external tethers 100 may be uninflatable. In other words, the external tethers 100 do not define an inflation chamber, e.g., the external tethers 100 may be a panel of material that is not fixed to another panel, or itself, to enclose a volume for receiving inflation medium. The external tethers 100 may be a woven fabric, or any other suitable material.

The second arm 24 pulls the external tethers 100, e.g., about the rotational axis R. when the second arm 24 rotates to the deployed position. The external tethers 100 may be under tension when the second arm 24 is in the deployed position. In other words, the external tethers 100 may be taught, i.e., not relaxed, when the second arm 24 is in the deployed position. By tensioning the external tethers 100, the external tethers 100 may be a reaction surface for the airbag 26. That is, the external tethers 100 may provide a counteracting force against the airbag 26 when the airbag 26 is impacted by the occupant. In such an example, the external tethers 100 may provide lateral support for the airbag 26, which may assist the airbag 26 in controlling occupant kinematics.

The inflator 86 is in fluid communication with the airbag 26. The inflator 86 expands the airbag 26 with inflation medium, such as a gas, to move the airbag 26 from the uninflated position to the inflated position. The inflator 86 may be supported by any suitable component. For example, the inflator 86 may be fixed to the seatback 14, e.g., the seat frame 78, and spaced from the airbag housing 20, as shown in FIGS. 1 and 2. As another example, the inflator 86 may be attached to the first arm 22. In such an example, the inflator 86 may be in the cavity between the first arm 22 and the second arm 24.

The inflator 86 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 86 may be, for example, at least partially in an inflation chamber of the airbag 26 to deliver inflation medium directly to the inflation chamber or may be connected to the inflation chamber through fill tubes, diffusers, etc.

Figure 7:
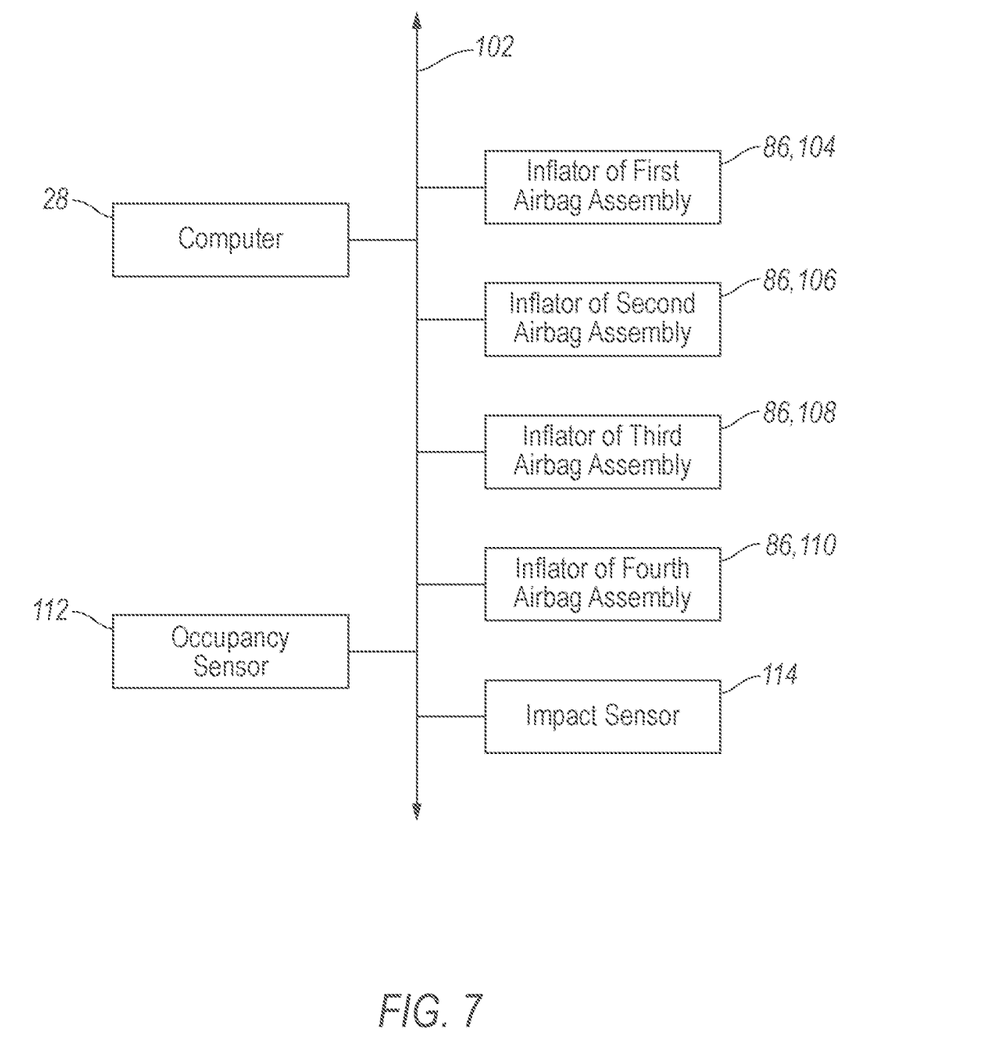
FIG. 7 is a block diagram of a system of the vehicle.

With reference to FIG. 7, the vehicle 10 includes the computer 28 including a processor and a memory. The computer 28 may be a restraints control module. The memory includes one or more forms of computer readable media, and stores instructions executable by the computer 28 for performing various operations, including as disclosed herein and including, for example, method shown in FIG. 8 and described below. For example, the computer 28 may be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 28 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 28. The memory may be of any type, e.g., hard disk drives, solid state drives, servers, or any volatile or non-volatile media. The memory may store the collected data sent from the sensors. The memory may be a separate device from the computer 28, and the computer 28 may retrieve information stored by the memory via a vehicle communication network 102, e.g., over a CAN bus, a wireless network, etc. Alternatively or additionally, the memory may be part of the computer 28, e.g., as a memory of the computer 28.

As shown in FIG. 7, the computer 28 is generally arranged for communications on the vehicle communication network 102 that may include a bus in the vehicle 10 such as a controller area network CAN or the like, and/or other wired and/or wireless mechanisms. Alternatively or additionally, in cases where the computer 28 includes a plurality of devices, the vehicle communication network 102 may be used for communications between devices represented as the computer 28 in this disclosure. Further, as mentioned below, various controllers and/or sensors may provide data to the computer 28 via the vehicle communication network 102.

The vehicle 10 may include at least one impact sensor 114 for sensing certain impacts of the vehicle 10. The computer 28 is in communication with the impact sensor 114 and the actuators. The computer 28 may activate the actuator, e.g., provide an impulse to the pyrotechnic charge, a command to the motor, etc., when the impact sensor 114 senses certain impact of the vehicle 10. Alternatively, or additionally to sensing impact, the impact sensor 114 may be configured to sense certain impact prior to impact, i.e., pre-impact sensing. The impact sensor 114 may be of any suitable type, for example, post contact sensors such as accelerometers, pressure sensors, and contact switches; and pre-impact sensor 114s such as radar, LIDAR, and vision sensing systems. The vision sensing systems may include one or more cameras, CCD image sensors, CMOS image sensors, etc. The impact sensor 114 may be located at numerous points in or on the vehicle 10.

The vehicle 10 may include at least one occupancy sensor 112. The occupancy sensor 112 configured to detect occupancy of the vehicle seats 12, e.g., detect an occupant 32 in the occupant-seating area. Specifically, the occupancy sensor 112 may detect occupancy of the seat by a CRS 30 and/or an occupant 32 seated directly on the seat, e.g., and adult occupant.

The occupancy sensor 112 may be visible-light or infrared cameras directed at the vehicle seat 12, weight sensors supported by the seat bottom 16, sensors detecting whether a seatbelt assembly for the seat is buckled, or other suitable sensors. The occupancy sensor 112 provides data to the computer 28 specifying whether the vehicle seat 12 is occupied or unoccupied and information regarding the type of occupant.

As one example, the vehicle 10 may include one occupancy sensor 112 for each occupant-seating area 18. As another example, the vehicle 10 may include one occupancy sensor 112 that is designed to individually detect occupancy of each occupant-seating area 18.

The occupancy sensor 112 is designed to detect data identifying the type of occupancy, e.g., a CRS 30 on the occupant-seating area 18, an adult occupant directly seated on the occupant-seating area 18, etc. In some examples, the occupancy sensor 112 may determine the type of occupant, a CRS 30 on the occupant-seating area 18, an adult occupant directly seated on the occupant-seating area 18, etc. In other examples, the occupancy sensor 112 may communicate data to the computer 28 for use by the computer 28 to identify the type of occupant.

Figure 8:
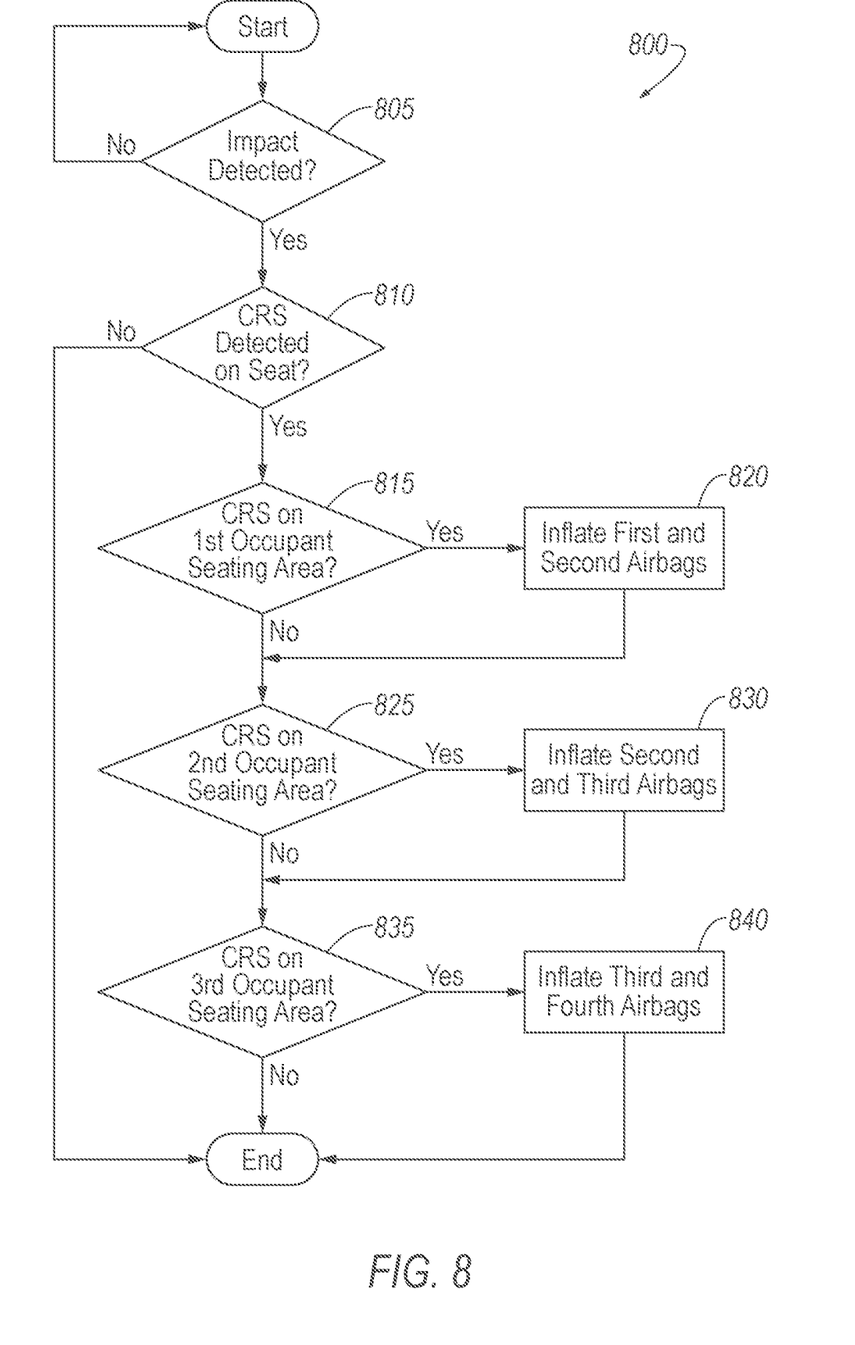
FIG. 8 is a flow chart of an example process.

With reference to FIG. 8, the computer 28 stores instructions to control components of the vehicle 10 according to the method 800 shown in FIG. 8. Use of "in response to," "based on," and "upon determining" herein indicates a causal relationship, not merely a temporal relationship.

In the method 800, the computer 28 selectively deploys the first airbag assembly 40, 42, the second airbag assembly 40, 44, the third airbag assembly 40, 46, and the fourth airbag assembly 40, 48 based on detection of a CRS 30 in the first occupant-seating area 18, 34, the second occupant-seating area 18, 36, and/or the third occupant-seating area 18, 38. Specifically, the example method 800, the computer 28 deploys the airbag assemblies 40, 42, 44, 46, 48 adjacent a respective occupant-seating area 18 on opposing sides of that occupant-seating area 18 when a CRS 30 is detected on that occupant-seating area 18 when certain vehicle impacts are detected. In other examples, the computer 28 may deploy one of the airbag assemblies 40, 42, 44, 46, 48 adjacent a respective occupant-seating area 18 when a CRS 30 is detected on that occupant-seating area 18 when certain vehicle impacts are detected.

In block 805, the method 800 includes detecting certain vehicle impacts. Specifically, the impact sensor 114, as described above, may detect certain vehicle impacts. In such an example, the impact sensor 114 communicates the detection of certain vehicle impacts to the computer 28, e.g., by sending a signal over the vehicle communication network 102. In the event a certain vehicle impact is not detected, the method 800 returns block to start. In the event an occupant 32 is detected, the method 800 proceeds to block 810.

With reference to block 810 of FIG. 8, the method 800 includes detecting an occupant 32 in the occupant-seating area 18. Specifically, the occupancy sensor 112, as described above, may detect occupancy of the occupant-seating areas 18 by a CRS 30 and/or another occupant. In such an example, the occupancy sensor 112 communicates the detection of the occupant and information regarding the type of occupant to the computer 28, e.g., by sending a signal over the vehicle communication network 102. In the event no occupant is detected, the method 800 returns to start. In the event an occupant 32 is detected, the method 800 proceeds as described below.

Specifically, with reference to block 810, the method 800 ends in response to detection of certain vehicle impacts and no detection of a CRS 30 on any of the occupant-seating areas 18. In other words, none of the airbag assemblies 42, 44, 46, 48 are deployed in the event no CRS 30 is detect. For example, if an adult occupant seated directly on the occupant-seating area 18 is detected, and no CRS 30 on any of the occupant-seating areas 18 is detected, then none of the airbag assemblies 42, 44, 46, 48 are deployed and the method 800 ends. In other words, in the event that an adult occupant is detected on one of the occupant-seating areas 18, the method 800 maintains the airbags 26 on either cross-vehicle side of the adult in an uninflated position unless otherwise inflated based on detection of a CRS 30 on an adjacent occupant-seating area 18. Said differently, if only an adult occupant is detected on one of the occupant-seating areas 18, and no CRS 30 is detected on any occupant-seating area 18, the method 800 maintains the airbags 26 on either cross-vehicle side of the adult in an uninflated position.

With reference to blocks 815-840, the method includes selectively deploying the airbag assemblies 42, 44, 46, 48 based on occupancy of the occupant-seating areas 18 and detection of certain vehicle impacts. The airbag assemblies 42, 44, 46, 48 may be deployed by commanding the respective inflator 104, 106, 108, 110 of the airbag assembly 40 to inflate, which causes the second arm 24 to rotate relative to the first arm 22, as described above.

Specifically, with reference to blocks 815 and 820, if a CRS 30 is detected on the first occupant-seating area 18, 34, the method 800 includes deploying the first airbag assembly 40, 42 and the second airbag assembly 40, 44 in response to the detection of the CRS 30 on the first occupant-seating area 18, 34 and detection of certain vehicle impacts. With reference to blocks 825 and 830, if a CRS 30 is detected on the second occupant-seating area 18, 36, the method 800 includes deploying the second airbag assembly 40, 44 and the third airbag assembly 40, 46 in response to the detection of the CRS 30 on the second occupant-seating area 18, 36 and detection of certain vehicle impacts. With reference to blocks 835 and 840, if a CRS 30 is detected on the third occupant-seating area 18, 38, the method 800 includes deploying the third airbag assembly 40, 46 and the fourth airbag assembly 40, 48 in response to the detection of the CRS 30 on the third occupant-seating area 18, 38 and detection of certain vehicle impacts.

In blocks 815-840, the method 800 may include deployment of an airbag 26 adjacent an adult occupant in the event the adult occupant is seated in the occupant-seating area 18 adjacent a CRS 30 and certain vehicle impact is detected. However, in such an example, the detection of the adult occupant does not trigger deployment of the airbag assembly 40 by the computer 28 but instead the airbag assembly 40 between the adult occupant and the CRS 30 is deployed based on detection of the CRS 30 and certain vehicle impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a vehicle seat having a seatback and a seat bottom defining an occupant-seating area;
an airbag housing having a first arm fixed to the seatback and a second arm rotatable from the seatback toward the seat bottom adjacent the occupant-seating area;
an airbag extending from the first arm to the second arm, the airbag being fixed to the first arm and the second arm; and
a computer including a processor and a memory storing instructions executable by the processor to:
detect a removeable child-restraint system on the occupant-seating area;
based on the detection of the removeable child-restraint system on the occupant-seating area, inflate the airbag in response to detection of certain vehicle impacts; and
maintain the airbag in an uninflated position based on detection of an adult occupant in the occupant-seating area in response to detection of certain vehicle impacts.

2. The vehicle of claim 1, further comprising:
a second airbag housing spaced from the airbag housing, the occupant-seating area being between the airbag housing and the second airbag housing;
the second airbag housing having a first arm fixed to the seatback and a second arm rotatable from the seatback toward the seat bottom;
a second airbag extending from the first arm of the second airbag housing to the second arm of the second airbag housing, the second airbag being fixed to the first arm of the second airbag housing and the second arm of the second airbag housing; and
the memory storing instructions executable by the processor to:
based on detection of the removeable child-restraint system on the occupant-seating area, inflate the second airbag in response to detection of certain vehicle impacts.

3. The vehicle of claim 2, further comprising:
a third airbag housing spaced from the second airbag housing, the vehicle seat defining a second occupant-seating area between the second airbag housing and the third airbag housing;
the second airbag housing being between the occupant-seating area and the second occupant-seating area;
the third airbag housing having a first arm fixed to the seatback and a second arm rotatable from the seatback toward the seat bottom;
a third airbag extending from the first arm of the second airbag housing to the second arm of the third airbag housing, the third airbag being fixed to the first arm of the third airbag housing and the second arm of the third airbag housing; and
the memory storing instructions executable by the processor to:
based on the detection of the removeable child-restraint system on the second occupant-seating area, inflate the second airbag and the third airbag in response to detection of certain vehicle impacts.

4. The vehicle of claim 3, further comprising:
a fourth airbag housing spaced from the third airbag housing, the vehicle seat defining a third occupant-seating area between the third airbag housing and the fourth airbag housing;
the third airbag housing being between the second occupant-seating area and the third occupant-seating area;
the fourth airbag housing having a first arm fixed to the seatback and a second arm rotatable from the seatback toward the seat bottom;
a fourth airbag extending from the first arm of the fourth airbag housing to the second arm of the fourth airbag housing, the fourth airbag being fixed to the first arm of the fourth airbag housing and the second arm of the fourth airbag housing; and
the memory storing instructions executable by the processor to:
based on the detection of the removeable child-restraint system on the third occupant-seating area, inflate the third airbag and the fourth airbag in response to detection of certain vehicle impacts.

5. The vehicle of claim 1, wherein the airbag is inflatable from the uninflated position to an inflated position, the airbag rotating the second arm toward the seat bottom from the uninflated position to the inflated position.

6. The vehicle of claim 1, wherein the second arm extends along the first arm in an undeployed position, and the second arm extends transverse the first arm in a deployed position.

7. The vehicle of claim 1, wherein the vehicle seat includes a bracket on the seat bottom, the second arm is engaged with the bracket when the second arm is in a deployed position.

8. The vehicle of claim 1, further comprising a plurality of external tethers extending from the first arm to the second arm when the airbag is inflated in an inflated position.

9. The vehicle of claim 8, wherein the external tethers are attached to the first arm, the second arm, and the airbag, the external tethers are under tension between the first arm and second arm when the airbag is in the inflated position.

10. The vehicle of claim 8, wherein the external tethers are a reaction surface for the airbag in the inflated position.

11. The vehicle of claim 8, wherein the external tethers are uninflatable.

12. The vehicle of claim 1, further comprising an inflator in fluid communication with the airbag, the inflator is fixed to the airbag housing.

13. The vehicle of claim 1, further comprising a hinge between the first arm and the second arm.

14. The vehicle of claim 13, wherein the hinge is a locking hinge.

15. A vehicle comprising:
a vehicle seat having a seatback and a seat bottom defining an occupant-seating area;
an airbag housing having a first arm fixed to the seatback and a second arm rotatable from the seatback toward the seat bottom adjacent the occupant-seating area;
an airbag extending from the first arm to the second arm, the airbag being fixed to the first arm and the second arm; and
a second airbag housing spaced from the airbag housing, the occupant-seating area being between the airbag housing and the second airbag housing;
the second airbag housing having a first arm fixed to the seatback and a second arm rotatable from the seatback toward the seat bottom;
a second airbag extending from the first arm of the second airbag housing to the second arm of the second airbag housing, the second airbag being fixed to the first arm of the second airbag housing and the second arm of the second airbag housing; and a computer including a processor and a memory storing instructions executable by the processor to:
  detect a removeable child-restraint system on the occupant-seating area;
  based on the detection of the removeable child-restraint system on the occupant-seating area, inflate the airbag in response to detection of certain vehicle impacts; and
  based on detection of the removeable child-restraint system on the occupant-seating area, inflate the second airbag in response to detection of certain vehicle impacts.

16. The vehicle of claim 15, further comprising:
a third airbag housing spaced from the second airbag housing, the vehicle seat defining a second occupant-seating area between the second airbag housing and the third airbag housing;
the second airbag housing being between the occupant-seating area and the second occupant-seating area;
the third airbag housing having a first arm fixed to the seatback and a second arm rotatable from the seatback toward the seat bottom;
a third airbag extending from the first arm of the second airbag housing to the second arm of the third airbag housing, the third airbag being fixed to the first arm of the third airbag housing and the second arm of the third airbag housing; and
the memory storing instructions executable by the processor to:
based on the detection of the removeable child-restraint system on the second occupant-seating area, inflate the second airbag and the third airbag in response to detection of certain vehicle impacts.

17. The vehicle of claim 16, further comprising:
a fourth airbag housing spaced from the third airbag housing, the vehicle seat defining a third occupant-seating area between the third airbag housing and the fourth airbag housing;
the third airbag housing being between the second occupant-seating area and the third occupant-seating area;
the fourth airbag housing having a first arm fixed to the seatback and a second arm rotatable from the seatback toward the seat bottom;
a fourth airbag extending from the first arm of the fourth airbag housing to the second arm of the fourth airbag housing, the fourth airbag being fixed to the first arm of the fourth airbag housing and the second arm of the fourth airbag housing; and
the memory storing instructions executable by the processor to:
based on the detection of the removeable child-restraint system on the third occupant-seating area, inflate the third airbag and the fourth airbag in response to detection of certain vehicle impacts.

18. The vehicle of claim 15, wherein the airbag is inflatable from an uninflated position to an inflated position, the airbag rotating the second arm toward the seat bottom from the uninflated position to the inflated position.

19. The vehicle of claim 15, wherein the second arm extends along the first arm in an undeployed position, and the second arm extends transverse the first arm in a deployed position.

20. The vehicle of claim 15, wherein the vehicle seat includes a bracket on the seat bottom, the second arm is engaged with the bracket when the second arm is in a deployed position.

* * * * *